United States Patent
Fujioka

(10) Patent No.: US 10,464,376 B2
(45) Date of Patent: Nov. 5, 2019

(54) PNEUMATIC TIRE

(71) Applicant: TOYO TIRE & RUBBER CO., LTD., Osaka-shi, Osaka (JP)

(72) Inventor: Tsuyoshi Fujioka, Osaka (JP)

(73) Assignee: TOYO TIRE CORPORATION, Itami-shi (JP)

(*) Notice: Subject to any disclaimer, the term of this patent is extended or adjusted under 35 U.S.C. 154(b) by 184 days.

(21) Appl. No.: 14/941,935

(22) Filed: Nov. 16, 2015

(65) Prior Publication Data

US 2016/0137003 A1    May 19, 2016

(30) Foreign Application Priority Data

Nov. 18, 2014 (JP) ................................. 2014-233821

(51) Int. Cl.
  *B60C 11/13* (2006.01)
  *B60C 11/11* (2006.01)
  *B60C 11/03* (2006.01)

(52) U.S. Cl.
  CPC ............ *B60C 11/11* (2013.01); *B60C 11/032* (2013.01); *B60C 11/1307* (2013.01); *B60C 2011/0341* (2013.01); *B60C 2011/0346* (2013.01); *B60C 2011/1338* (2013.01); *B60C 2011/1361* (2013.01)

(58) Field of Classification Search
  CPC ............ B60C 11/1307; B60C 11/1315; B60C 11/1323; B60C 2011/1338; B60C 11/0306; B60C 11/0309
  See application file for complete search history.

(56) References Cited

U.S. PATENT DOCUMENTS

| 5,301,727 A | 4/1994 | Inoue |
| 2002/0157749 A1 | 10/2002 | Neumann |
| 2010/0258228 A1* | 10/2010 | De Benedittis ......... B60C 11/13 |
| | | 152/209.21 |
| 2014/0116589 A1* | 5/2014 | Grote .................... B60C 11/045 |
| | | 152/209.21 |

FOREIGN PATENT DOCUMENTS

| CN | 101903195 A | 12/2010 |
| EP | 1923234 | * 5/2008 |
| EP | 2730434 | * 5/2014 |
| JP | 2009-029255 A | 2/2009 |
| JP | 2012-148678 A | 8/2012 |

(Continued)

OTHER PUBLICATIONS

Office Action dated Dec. 29, 2016, issued in counterpart Chinese Patent Application No. 2015107921952, with English translation. (13 pages).

(Continued)

*Primary Examiner* — Robert C Dye
(74) *Attorney, Agent, or Firm* — Westerman, Hattori, Daniels & Adrian, LLP

(57) ABSTRACT

On a tread portion, a plurality of blocks are formed by a plurality of main grooves annularly continuously extending in a tire circumferential direction, and a plurality of transverse grooves extending in a tire width direction, intersecting these main grooves. Each block has projections on side surfaces, which form each transverse groove, at corner regions thereof.

4 Claims, 3 Drawing Sheets

(56) References Cited

FOREIGN PATENT DOCUMENTS

KR   10-2010-0052681 A   5/2010
WO   2009/082394 A1   7/2009

OTHER PUBLICATIONS

Office Action dated Nov. 25, 2016, issued in counterpart Canadian Application No. 2,911,606. (4 pages).
Office Action dated Sep. 14, 2017, issued in counterpart Canadian Application No. 2911606. (3 pages).
Office Action dated Mar. 27, 2018, issued in counterpart Japanese Application No. 2014-233821, with English translation (7 pages).
Office Action dated Dec. 4, 2018, issued in counterpart Canadian application No. 2,911,606. (3 pages).

* cited by examiner

PNEUMATIC TIRE

CROSS-REFERENCE TO RELATED APPLICATION

This application claims priority of Japanese Patent Application No. 2014-233821, the content of which is incorporated herein by reference.

BACKGROUND OF THE INVENTION

The present invention relates to a pneumatic tire.

Heretofore, there is publicly known a conventional pneumatic tire having a projection formed on at least one-side groove wall of each width direction groove of a tread center part (e.g., refer to JP 2012-148678 A).

However, the above projection is only effective as anti-stone biting performance, namely the performance which can prevent pebbles and the like on a road surface from getting caught in a groove portion. When travelling on a muddy area with such tires mounted, mud and the like penetrate into the groove portion so that they may get stuck. In this case, traction performance of the tires deteriorates, or side-slipping occurs when cornering.

SUMMARY OF INVENTION

Technical Problem

It is an object of the present invention to provide a pneumatic tire which can exhibit excellent mud removal performance.

Solution to Problem

As means for solving the above problem, the present invention provides a pneumatic tire comprising, on a tread portion, a plurality of blocks formed by a plurality of main grooves annularly continuously extending in a tire circumferential direction, and a plurality of transverse grooves extending in a tire width direction, intersecting these main grooves, wherein each block has a projection on a side surface, which forms each transverse groove, at a corner region thereof.

With this construction, the block contacting the ground is elastically deformed, and its shape changes particularly at the corner region thereof. The projection is formed at the corner region, and greatly displaced according to its elastic deformation. Therefore, even if the tires travel on a muddy place, and mud and the like penetrate into the transverse groove, they are effectively scraped out by the projection. That is, the tires are excellent in mud removal performance.

It is preferred that a lower end of the projection is located above the bottom of the transverse groove, and an upper end thereof is located within a range of a half or more of a depth dimension from the bottom of the transverse groove.

This construction makes the lower end portion of the projection less likely to hamper elastic deformation of the block, so that displacement of the projection accompanying the elastic deformation of the block is hardly suppressed. Also, locating the upper end of the projection above in the transverse groove can enhance mud removal performance.

It is preferred that a projection range of the projection on the side surface is set so that a ratio R1 of a vertical length dimension of the projection to a depth dimension of the transverse groove satisfies 30%≤R1≤80%.

This construction can further increase a movable volume caused by the displacement of the projection accompanying the elastic deformation of the block, thus making it possible to further enhance mud removal performance.

It is preferred that the projection has a gradually reduced width dimension toward its projection direction from the side surface of the block.

With this construction, even if a force is exerted on the projection itself, cracks and the like hardly occur and thus good mud removal performance can be maintained over a long period of time.

It is preferred that a ratio R2 of a projection dimension of the projection to a width dimension of the transverse groove at a maximum projection position of the projection from the side surface of the block satisfies 20%≤R2≤60%.

With this construction, the displacement of the projection accompanying the elastic deformation of the block can be made within a range suitable for mud removal.

It is preferred that the corner region of the block is preferably a side surface of a projecting portion which projects from any of sides of a parallelogram and which has a smaller width dimension than the side.

With this construction, the deformation amount of the corner region can be sufficiently increased by the elastic deformation of the block. Therefore, it becomes possible to secure the desired mud removal performance by increasing the displacement of the projection.

According to the present invention, since the projection is formed on the side surface, which forms the transverse groove, at the corner region of the block, the displacement of the projection can be increased by the elastic deformation of the block due to its contacting the ground. Therefore, the tire of the present invention is excellent in mud removal performance. Even if mud and the like penetrate into the transverse groove, they can be efficiently removed by the projections.

DETAILED DESCRIPTION OF THE PREFERRED EMBODIMENTS

The present invention will hereinafter be described with reference to the attached drawings. The following description is essentially a mere illustration, and is not intended to limit the present invention, its application, or its use. The drawings are schematic, and ratios of the respective dimensions are different from actual ones.

Figure 1:
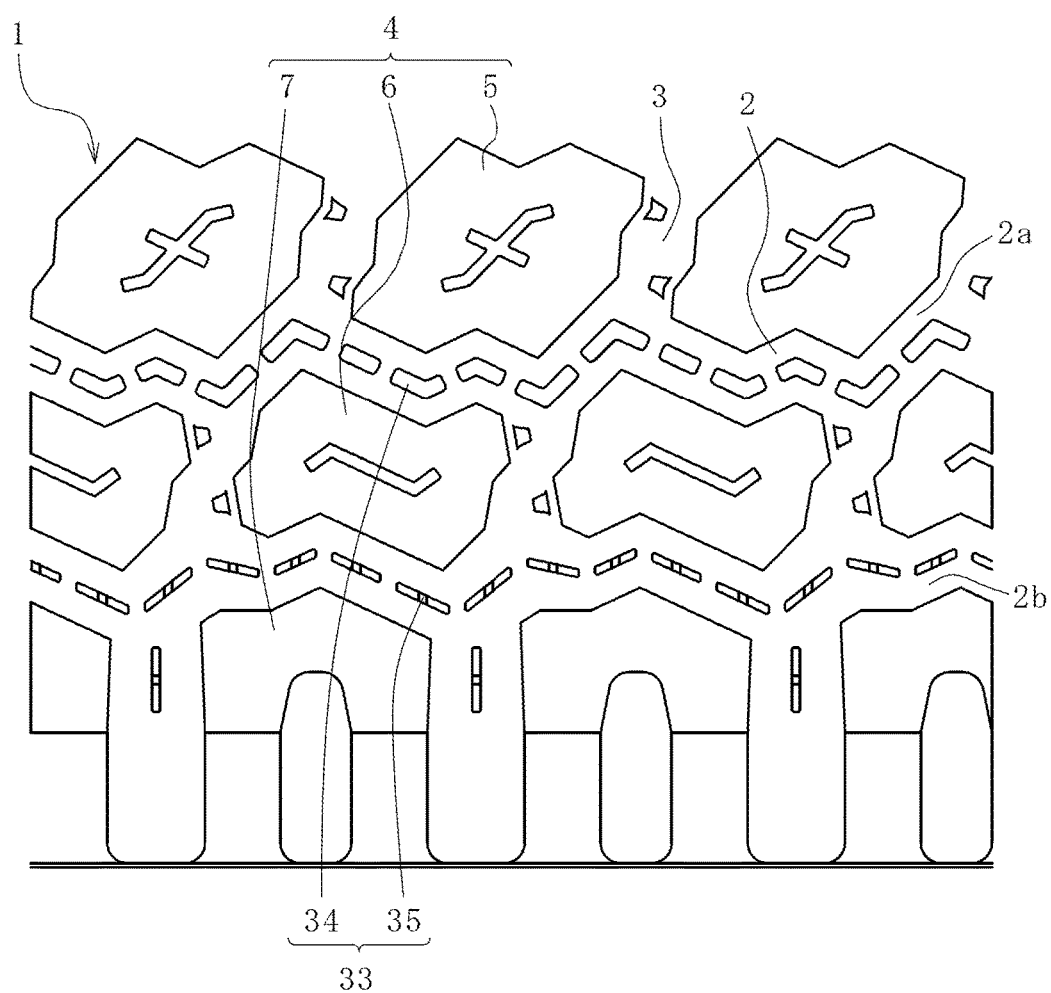
FIG. 1 is a partial development view of a tread portion according to the present embodiment.

FIG. 1 shows a partial development view of a tread portion 1 of the present embodiment. In the tread portion 1, a plurality of main grooves 2 annularly continuously extending in a tire circumferential direction, and a plurality of transverse grooves 3 extending in a tire width direction, intersecting these main grooves 2 are formed. Herein, the main grooves 2 each of which has a zigzag-shape, and which are four in number (only a first groove 2a and a second groove 2b on one side are shown, and the other two are omitted) are formed at predetermined intervals in the tire width direction. The transverse grooves 3 are each provided slantly with respect to a straight line extending in the tire width direction. A plurality of blocks 4 are formed by the main grooves 2 and the transverse grooves 3.

The blocks 4 consist of center blocks 5 arranged in the tire circumferential direction at the center of the tire-width direction, mediated blocks 6 arranged on both sides thereof (those arranged on one side are omitted), and side blocks 7 arranged on further outsides thereof (those arranged on one side are omitted).

Figure 2:
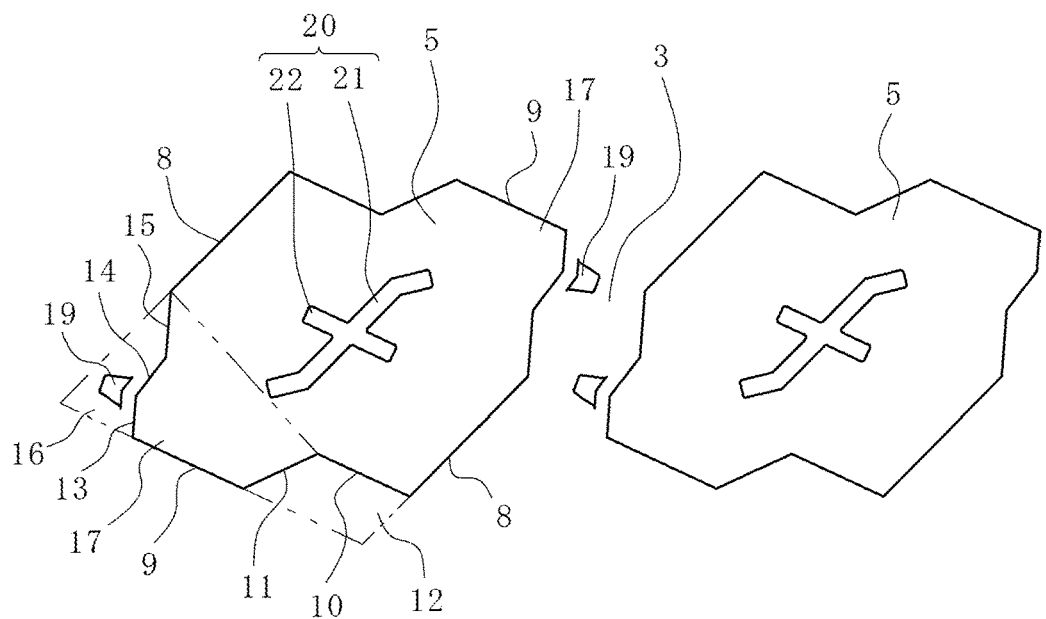
FIG. 2 is an enlarged view of center blocks of FIG. 1.

As shown in FIG. 2, when the tread portion 1 is seen in plan view, each center block 5 is formed in a shape obtained by cutting off four corners of a parallelogram surrounded by a pair of mutually parallel long sides 8 and a pair of mutually parallel short sides 9. Of the two pairs of diagonally positioned corners, at one pair of corners, a first cutoff side 10 parallel to each short side 9, and a second cutoff side 11 more slanted than a straight line parallel to each long side 8, which form each corner, are formed (an area cut off to the first cutoff line 10 and the second cutoff line 11 from the original shape of the parallelogram will hereinafter be referred to as a first cutoff portion 12). The other pair of corners is cut off so that three zigzag-shaped sides (a third cutoff side 13, a fourth cutoff side 14 and a fifth cutoff side 15) are obtained (an area cut off to these three sides from the original shape of the parallelogram will hereinafter be referred to as a second cutoff portion 16).

In the center block 5, a pair of diagonally positioned projecting portions 17, each of which is formed by the first cutoff portion 12 and the second cutoff portion 16, are formed. That is, each first projecting portion 17 having a narrower width than other portions is formed by the second cutoff side 11, the short side 9, the third cutoff side 13, the fourth cutoff side 14, and the fifth cutoff side 15.

Figure 4:
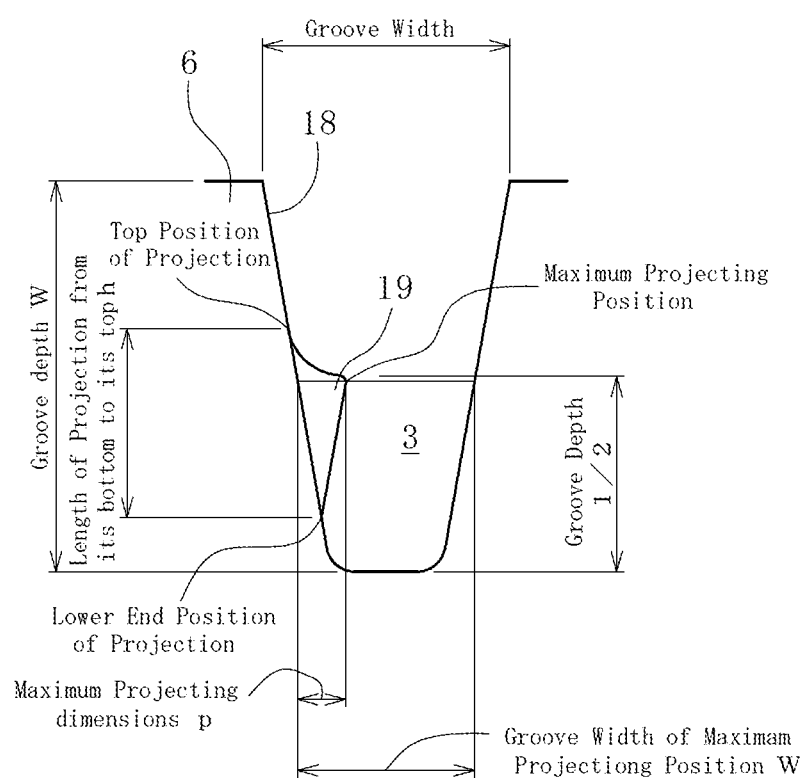
FIG. 4 is a partial cross-sectional view of a center block and a mediate block of FIG. 1.

As shown in FIG. 4, a side surface 18 of the center block 5 is formed of an inclined surface gradually projecting toward inside of the groove as it goes down to the bottom of the main groove 2 and the transverse groove 3. An upper end portion of the side surface 18 is formed in a convex shape having an arc shape in cross section so as to smoothly reach the side surface 18 from a surface of the center block 5. A lower end portion of the side surface 18 is formed in a concave shape having an arc shape in cross section so as to smoothly reach the bottom of the groove from the side surface 18. A first projection 19 is formed on the side surface 18 of the center block 5.

As shown in FIG. 2, of the side surfaces 18 forming corners of the center block 5 (the first projecting portion 17), the first projection 19 is formed at a corner region of the side surfaces 18 forming the transverse groove 3. The corner region herein means the side surfaces 18 of the first projecting portion 17, which is a portion where the deformation amount becomes greater than that of other portions when the center block 5 is elastically deformed by contacting the ground. Specifically, the first projection 19 is formed at a region corresponding to a boundary portion of the third cutoff side 13 and the fourth cutoff side 14 of the first projecting portion 17, namely, formed straddling both the side surfaces 18 corresponding to the third cutoff side 13 and the fourth cutoff side 14. In this manner, since the first projection 19 is formed on the first projecting portion 17 having a large deformation amount, it is possible to increase the displacement of the first projection 19.

A lower end of the first projection 19 is located above the bottom of the transverse groove 3. Therefore, when the center block 5 contacts the ground and is elastically deformed, the first projection 19 does not hamper the deformation thereof. A predetermined region from the lower end to an upper side (lower end portion) is formed of a concave (R-shape) curved surface having an arc shape in cross section so as to be smoothly continuous with respect to the side surface 18. A radius of curvature R of the lower end portion is set so that cracks do not occur due to stress concentration when the center block 5 contacts the ground and is elastically deformed.

On the other hand, an upper end of the first projection 19 is located above, beyond a position of a half of a groove depth from the bottom of the transverse groove 3. Therefore, the displacement of the first projection 19 becomes sufficient due to elastic deformation of the center block 5. A predetermined region from the upper end of the first projection 19 to a lower side (upper end portion) is formed of a concave (R-shape) curved surface having an arc shape in cross section so as to be smoothly continuous with respect to the side surface 18, similarly to the lower end portion.

In this manner, since the upper end position and lower end position of the first projection 19 are set, it is sufficiently deformed accompanying the elastic deformation of the center block 5. Therefore, even if mud and the like get stuck in the transverse groove 3, they can be reliably removed.

A vertical length h of the first projection 19 is set so that a ratio R1 of the vertical length h to a depth W of the transverse groove 3 (=h/W) satisfies 30%≤R1≤80%. If the length of the first projection 19 is less than 30%, a displacement region of the first projection 19 accompanying the elastic deformation of the center block 5 is narrow, so that sufficient mud removal performance cannot be exhibited. On the other hand, if the length of the first projection 19 exceeds 80%, a sufficient distance between the lower end position and the bottom of the groove cannot be secured. Therefore, the R dimension of the curved surface formed at the lower end portion of the first projection 19 becomes small, so that cracks may occur due to stress concentration when the center block 5 is elastically deformed.

A width dimension of the first projection 19 is set so as to be gradually reduced as it projects from both the side surfaces 18. The width dimension of the first projection 19 at a maximum projection position where the first projection 19 projects most is set as follows: That is, a ratio R2 of a projection dimension p of the first projection 19 to a width dimension W of the transverse groove 3 at a maximum projection position of the projection from the side surface 18 of the block 4 (=p/W) satisfies 20%≤R2≤60%. If the projection ratio of the first projection 19 is less than 20%, the displacement of the first projection 19 is insufficient, so that the desired mud removal performance cannot be obtained. On the other hand, if the projection ratio of the first projection 19 exceeds 60%, the inside of the transverse groove 3 is clogged with the first projections 19, so that the desired mud removal performance cannot be obtained.

A first closed groove 20 is formed on a central portion of the surface of the center block 5. The first closed groove 20 consists of a first groove 21 extending on a center line parallel to both the long sides 8 of the center block 5, and a second groove 22 extending on a center line parallel to both the short sides 9 thereof. The first groove 21 is longer than the second groove 22, and both of them are formed to have the same width and depth. The first groove 21 and the second groove 22 are at right angles to each other at the center, and an intersection of the center lines of the respective grooves coincides with a gravity center position of the center block 5. Furthermore, both ends of the first groove 21 and the second groove 22 are terminated (closed) within the surface of the center block 5 so that they are not open to side surfaces 18 of the center block 5. This will secure a sufficient distance from each position of the first closed groove 20 to an outer edge of the center block 5. Both ends of the first groove 21 are bent conforming to the shape of the first projection 17 formed by the first cutoff portion 12 and the second cutoff portion 16.

Figure 3:
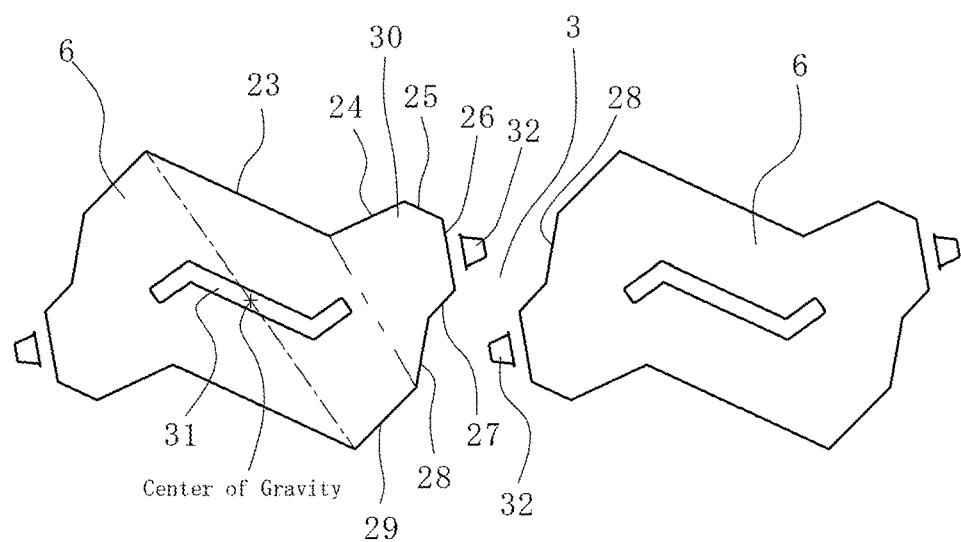
FIG. 3 is an enlarged view of mediate blocks of FIG. 1.

As shown in FIG. 3, each mediated block 6 has a roughly rectangular shape, and a half thereof consists of a first side 23, a second side 24, a third side 25, a fourth side 26, a fifth side 27, a sixth side 28, and a seventh side 29. The other half are formed at point-symmetrical positions around the gravity center position. Second projecting portions 30 are formed at a pair of diagonally positioned corners. Each second projecting portion 30 consists of the second to sixth sides 24-28. As shown in FIG. 1, the second side 24 and the third side 25 are parallel to the first cutoff side 10 and the second cutoff side 11 of the center block 5, respectively. A second closed groove 31 is formed at a central portion of the mediate block 6. The second closed groove 31 is arranged on a center line along the first side 23, and its both ends are respectively bent in their projection directions.

As shown in FIG. 4, similarly to the center block 5, a side surface 18 of the mediate block 6 is formed of an inclined surface gradually projecting toward inside of the groove as it goes down to the bottom of the main groove 2 and the transverse groove 3. An upper end portion of the side surface 18 is formed in a convex shape having an arc shape in cross section so as to smoothly reach the side surface 18 from a surface of the mediate block 6. A lower end portion of the side surface 18 is formed in a concave shape having an arc shape in cross section so as to smoothly reach the bottom of the groove from the side surface 18. A second projection 32 is formed on the side surface 18 of the mediate block 6.

That is, the second projections 32 are formed respectively on the fourth sides 26 of the second projecting portions 30, which are formed at diagonal positions of the mediate block 6. Each second projection 32 projects toward the sixth side of each mediate block 6 adjacently arranged through the transverse groove 3. Similarly to the first projection 19, a lower end position, upper end position, vertical length, width dimension, projection dimension from the side surface 18 and the like of the second projection 32 are determined.

A plurality of protrusions 33 are formed on a center line of the main groove 2. First protrusions 34 each of which has a width dimension of about a half of the width of the groove are formed on a first main groove 5a between the center block 5 and the mediate block 6. Some of the first protrusions 34 have a straight line shape formed on a straight line portion of the first main groove 5a, and others have a bent shape formed on a bent portion thereof. Second protrusions 35 each of which has a width dimension of about one tenth of the width of the groove are formed on a second main groove 5b between the mediate block 6 and the side block 7. All the second protrusions 35 have a straight line shape. These protrusions 33 have a role of preventing foreign materials such as stones from reaching and damaging the bottom of the groove, and of removing them from the main groove 2.

Next, operation of the pneumatic tire having the above construction will be described.

When the pneumatic tires having the above construction are mounted on a vehicle, and it travels on a bad road such as a muddy area, mud and the like penetrate into the main groove 2 and the transverse groove 3. The main groove 2 extends in a tire circumferential direction, so that mud and the like are easily removed to the outside. On the other hand, the transverse groove 3 extends in a tire width direction, so that the penetrated mud and the like are hardly removed to the outside if they are left as they are. The center block 5 and the mediate block 6 are elastically deformed to change their shapes when they contact the ground. In the center block 5 and the mediate block 6, the first projecting portion 17 and the second projecting portion 30, which have a largest deformation amount, are provided with the first projection 19 and the second projection 32, respectively. For that reason, the displacements of the first projection 19 and the second projection 20 can be increased sufficiently. Therefore, even if mud and the like penetrate into the transverse groove 3, they can be reliably removed by the first projection 19 and the second projection 20 having large displacements.

The present invention is not limited to the construction described in the above embodiment, and various modifications can be made.

In the above embodiment, although the first projection 19 is formed straddling both the side surfaces 18 corresponding to the third cutoff side 13 and the fourth cutoff side 14 forming a part of the first projecting portion 17 of the center block 5, only the side surface 18 corresponding to the third cutoff side 13, or the side surface 18 corresponding to the fourth cutoff side 14 may be provided with the first projection 19. Further, although the second projection 32 is formed on the side surface 18 corresponding to the fourth side 26 forming a part of the second projecting portion 30 of the mediate block 6, the second projection may be formed on the side surface 18 corresponding to the fifth side 27. Also, the shape of the block 4 is not limited to the above. Therefore, the block 4 may be of any shape that can be adopted as long as the projection is formed on the side surface 18, which forms the transverse groove 3, at the corner region of the block 4.

What is claimed is:

1. A pneumatic tire comprising, on a tread portion, a plurality of blocks formed by a plurality of main grooves annularly continuously extending in a tire circumferential direction, and a plurality of transverse grooves extending in a tire width direction, intersecting these main grooves, wherein each block has a shape, in a plan view of the tread portion, of a parallelogram including a pair of long sides parallel to each other and a pair of short sides parallel to each other, with corners of the parallelogram being removed, and each block including two corner regions and two projections, each of the two corner regions being respectively formed at each end of a longer diagonal of the parallelogram, and each of the two projections projecting from a side surface of each of the two corner regions into respective ones of the transverse grooves, wherein each of the two projections has a lower end located above a bottom of the transverse groove and an upper end located within a range of a half or more of a depth dimension of the transverse groove from the bottom of the transverse groove, wherein each of the two projections has a maximum projecting position projecting into the transverse groove at an intermediate location between the lower end and the upper end, and wherein each of the two projections has a concave curved surface extending in a groove depth direction from the upper end to the maximum projecting position to form a concave curve.

2. The pneumatic tire according to claim 1, wherein a projection range of each of the two projections on the side surface is set so that a ratio R1 of a vertical length dimension of each of the two projections to a depth dimension of the transverse groove satisfies $30\% \leq R1 \leq 80\%$.

3. The pneumatic tire according to claim 1, wherein a ratio R2 of a projection dimension of each of the two projections to the width dimension of the transverse groove at the maximum projection position from the side surface of the block satisfies $20\% \leq R2 \leq 60\%$.

4. The pneumatic tire according to claim 1, wherein the two corner regions of each block are positioned diagonally across from each other and each of the two projections respectively projects from the side surface at each of the two corner regions into the respective ones of the transverse grooves.

\* \* \* \* \*